United States Patent [19]
Hellouin de Menibus

[11] 3,748,898
[45] July 31, 1973

[54] METHOD AND APPARATUS RELATED TO THE TESTING OF HYDRAULIC CIRCUITS

[75] Inventor: Olivier André Henry Louis Hellouin de Menibus, Etampes, France

[73] Assignee: Societe D'Appareillages Et Materiels De Servitudes A.M.S., Choisy-Le-Roi, France

[22] Filed: Nov. 4, 1971

[21] Appl. No.: 195,603

[52] U.S. Cl. ......................... 73/168, 73/40
[51] Int. Cl. ............................ G01m 19/00
[58] Field of Search ............ 73/40, 39, 119, 119 A, 73/168, 39, 37

[56] References Cited
UNITED STATES PATENTS

| | | | |
|---|---|---|---|
| 2,364,709 | 12/1944 | Greer | 73/168 |
| 2,924,971 | 2/1960 | Schroeder et al. | 73/168 |
| 3,270,557 | 9/1966 | McClocklin | 73/168 |
| 3,347,094 | 10/1967 | Schroeder et al. | 73/168 |

Primary Examiner—Louis J. Capozi
Attorney—Edwin E. Greigg

[57] ABSTRACT

For performing tests on a hydraulic circuit, to the latter there is coupled an auxiliary hydraulic circuit which is associated with a testing stand and which comprises a high-pressure pump of variable output as well as a liquid tank of substantial volume. The rate of liquid flow into and out of said tank is maintained very accurately balanced by a first, continuously operating means effecting a coarse balancing and a second, intermittently operating means effecting a fine balancing. The said second means is actuated when the amplitude of variation in the volume of the liquid contained in said tank exceeds that resulting normally from the temperature changes of the liquid in the entire auxiliary circuit.

8 Claims, 4 Drawing Figures

METHOD AND APPARATUS RELATED TO THE TESTING OF HYDRAULIC CIRCUITS

BACKGROUND OF THE INVENTION

This invention relates to a method and a testing stand related to the testing and/or inspecting of hydraulic circuits, particularly those built into airplanes.

The testing of certain hydraulic circuits can be effected only when the pumping means associated with these circuits is in an inoperative condition. This is the case, for example, when hydraulic circuits of airplanes are examined on the ground. For this purpose the airplane is placed on jacks. It is thus not feasible to have the engines run at operational speed for several hours. Besides, the costs of such an operation are very substantial.

The aforenoted problem has been solved by short-circuiting the pump integrated with the circuit tested by means of an auxiliary circuit which includes a so-called "external" pump provided with its own driving means. The auxiliary circuit, the external pump and its driving means are mounted on a usually mobile chassis or testing stand which is brought as close as possible to the hose connections provided for the auxiliary circuit. Such an apparatus is sufficient in case there are no strict conditions imposed on the hydraulic circuit tested, for example, where it is not necessary to replace the tank associated with the circuit to be tested with another tank for the duration of the tests.

In the majority of hydraulic control circuits, however, particularly in case of hydraulic circuits associated with modern airplanes, the pressure and the volume of the hydraulic liquid enclosed in the tank of the circuit must not vary except within predetermined, relatively narrow limits and further, the liquid has to be degasified. Thus, in such a case, the tank of the hydraulic circuit to be tested comprises a low pressure stage and a high pressure stage, both entirely closed.

It is apparent that the aforenoted degasification cannot be effected during normal operation; such degasification is brought about each time the circuit is tested. For this reason the auxiliary circuit of the testing stand includes a relatively large tank in which there prevails a partial vacuum above the level of the liquid. The tank of the circuit to be tested thus has to be emptied, then the tank of the testing stand has to be vacuumized, then the tank of the circuit to be tested has to be recharged and the tank of the testing stand disconnected. Only after these steps can the testing operation take place. The transfers between the two tanks which sometimes have to be repeated several times are very time consuming and give rise to a number of problems. One of them — a substantial drawback — is the triggering of the safety and alarm systems which monitor the pressure and the volume in the low pressure stage of the circuit tank.

To avoid the aforenoted disadvantages it has already been proposed to effect the tests and the degasification simultaneously by maintaining the tank of the testing stand permanently connected to the circuit. In order to ensure that the liquid volume contained in the tank of the circuit tested remains substantially constant, but since it is not possible to attach in each case an automatic control means to said tank, it has been necessary to control and to maintain constant the liquid level in the tank of the testing stand. The volume of the latter, however, is about 10 times the volume of the tank of the circuit tested which represents approximately the maximum liquid quantity delivered per minute. In order to maintain the volume of the liquid in the tank of the circuit to be tested about 1/5, it is necessary to maintain the volume contained in the tank of the testing stand about 1/50. Stated differently, the permissible variations must be less than the flow quantity delivered per second. A manual control of a return valve at the tank of the testing stand is thus unsatisfactory; it is necessary that such valve be operated by a means sensing and controlling the liquid level in the tank.

The aforenoted solutions represent the present state of the art. They leave many problems unresolved due to the untimely transfers of the hydraulic oil between the two tanks which result in a variation of the liquid temperature and/or in a variation of the pressure in the low pressure stage of the circuit.

It is noted that during the course of the tests — as during the course of normal operation — the temperature of the liquid rises. This change of temperature is approximately 40° C which corresponds in case of hydraulic oil to a dilatation of fluid of approximately 3%. While a dilatation of such an extent may well be acceptable in the normal operation of the circuit, it is not admissible in a testing operation. The reason is that with the auxiliary circuit the total volume of the fluid is multiplied approximately by seven or more, and the overall variation of volume due to the temperature-caused expansion reaches and even exceeds the predetermined limit set for the circuit tested. The latter is the only one affected by this variation if the lever in the tank of the testing stand is maintained constant.

Furthermore, the conduits of the auxiliary circuit are often of substantial length and cause significant charging losses which are added to those due to the couplings between the auxiliary circuit and the circuit to be tested. These charging losses may reach 2 bars at a maximum flow rate when the pressure in the low pressure stage of the hydraulic circuit of an airplane, for example, is about 3 bars. Thus, the flow rate variation which is indispensable to conduct an entire series of tests may cause sudden and very substantial variations in the relative value of the pressure in the low pressure stage and, consequently, may cause similar variations of volume of the hydraulic liquid enclosed in the tank of the circuit tested. These variations are too rapid to permit a correction of the return valve setting by the automatic valve control to intervene before predetermined limits are exceeded. Stated differently, the delay of response of such automatic valve control devices is too long.

OBJECT AND SUMMARY OF THE INVENTION

It is an object of the invention to provide an improved hydraulic testing method and system in which the transfers of inadmissibly disadvantageous effect between the two tanks are eliminated.

For the aforenoted purpose, there is provided a testing stand comprising a tank of substantial volume wherein the inlet and outlet flow rates with respect to the tank of the testing stand are automatically and very accurately balanced by a continuously operating first means of lesser accuracy and by a second means of higher accuracy which, however, is actuated only when there is detected such an amplitude of variation in the liquid volume contained in the tank of the testing stand which exceeds that resulting normally from the temperature variation of the liquid for the entire circuit associated with the testing stand. Further, the return valve is associated with a means sensing the liquid level in the tank and arranged in such a manner that the reference level in the said tank varies as a function of the liquid temperature.

Thus, the quasi-constancy of the liquid volume in the low pressure stage of the circuit to be tested is ensured by the equality of the flow rates of the liquid entering and leaving the tank of the testing stand. This equality is first ensured approximately by first means permitting a large flow rate. This last-named means may be associated, for example, with a device sensing the pressure in the return conduit, or may be formed, in each branch of the testing stand circuit, of a device providing a constant flow rate, whereby the two flows are as close to each other as possible. The said first means operates continuously; it prevents too rapid variations of liquid volume in the circuit tested but it still allows slow and continuous variations to subsist. In order to obtain a near perfect equality of the two flows, the return flow rate is additionally corrected by providing for the return valve an actuator which senses the liquid level in the testing stand tank. For this purpose, however, the reference lever — corresponding to the position of rest of the level sensor — should vary as a function of the liquid temperature that is, as a function of the total volume of the liquid in the entire circuit.

The invention will be better understood as well as further objects and advantages become apparent from the ensuing specification of two exemplary embodiments taken in conjunction with the drawing.

DESCRIPTION OF THE EMBODIMENTS

Figure 1:
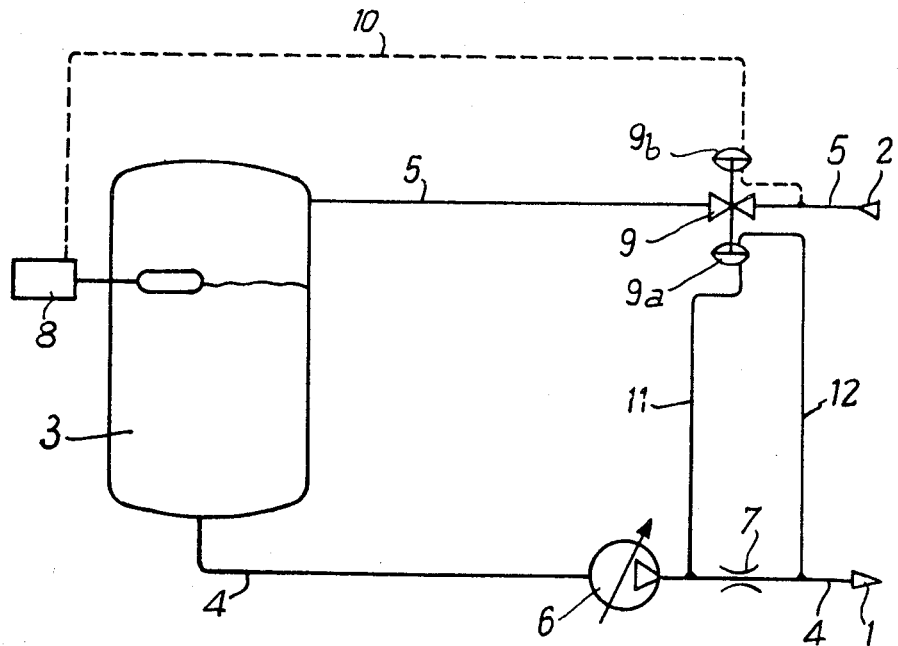
FIG. 1 is a schematic illustration of a first embodiment of the invention.

Turning now to FIG. 1, there is schematically shown an auxiliary hydraulic circuit of a testing stand used for examining a hydraulic circuit, for example, a hydraulic circuit of an airplane. The auxiliary circuit comprises two pipe couplings 1 and 2 which are, respectively, connected to the high pressure stage of the tank of the circuit to be tested and to the return branch leading to the low pressure stage of said tank to thus short-circuit the pump of the circuit tested. The auxiliary circuit includes a tank 3 from which the liquid is driven through a supply conduit 4, the coupling 1 and a nozzle 7 to the circuit to be tested. After having passed through the latter, the liquid returns through the coupling 2 and a return conduit 5 into the tank 3. The displacement of the liquid is effected by a high pressure pump 6 of variable output provided in the supply conduit 4. The pump 6 is driven by a motor (not shown) mounted on the testing stand. A level sensor 8 permits, as it will be described hereinafter, the regulation of the return flow rate as a function of the liquid level in the tank 3 by controlling a return valve 9 disposed in the conduit 5. The operative connection between the sensor 8 and the valve 9 is indicated with a broken line 10 in FIG. 1. The tank 3 is provided with a vacuum device, not shown, for degasifying the liquid.

The apparatus as described so far is a conventional device. It is to be noted in addition that an auxiliary circuit of the abovedescribed type also has a certain number of safety devices and control mechanisms such as filters, exchangers, shut-off valves for the circuit tested, regulating valves, etc., which are not shown and which form no part of, or have no function pertaining to the invention.

The level sensor 8 intermittently controls the return valve 9 for correcting the return flow rate in case of slow variations of the latter in order to balance the said return flow rate and the supply flow rate.

In order to permit a complete range of tests of the circuit, it is necessary to vary the supply flow rate by changing the output of the pump 6. It is noted that these variations may often be quite rapid and further, the charge losses in the coupling conduits of the auxiliary circuit may reach 2 bars at maximum flow rate. It is thus necessary to provide a valve which varies the return flow as a function of the return flow pressure and which functions with a variable regulating point (variable desired value). For a small flow rate, the regulating point should be substantially equal to the operational pressure of the low pressure stage of the circuit tested, for example, 3 bars, while for the maximum flow rate the regulating point should be equal to this operational pressure reduced by the charge losses of the connecting circuit, thus, for example, 1 bar. For this purpose it is advantageous to dispose in the return circuit an automatically balanced valve which affects continuously the return flow rate as a function of the pressure of the latter and the regulating point of which is a function of the difference of pressures upstream and downstream of the nozzle 7.

Figure 2:
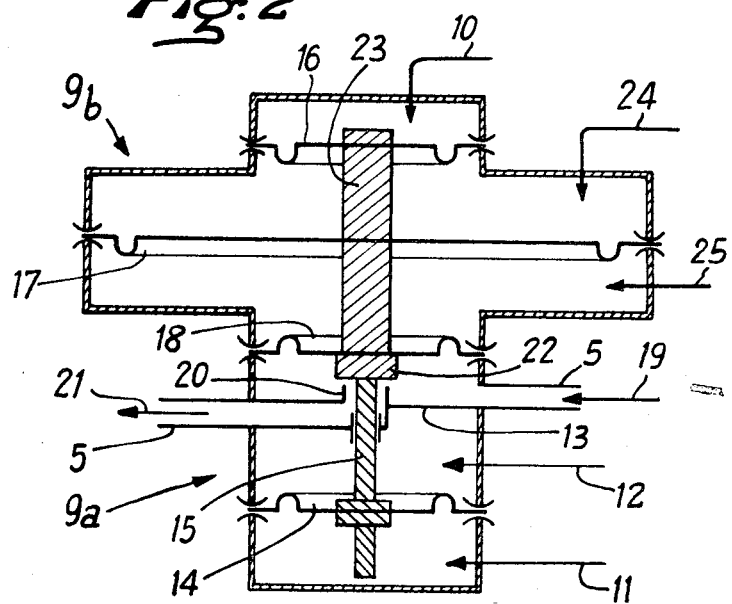
FIG. 2 is a schematic axial sectional view on an enlarged scale of one component shown in FIG. 1.

In the embodiment described, the aforenoted automatically balanced valve and the return valve 9 are combined in a sole pneumatic valve having four diaphragms, as illustrated in FIG. 2.

Turning now to FIG. 2, the valve 9 has two stages, a lower stage 9a and an upper stage 9b separated from one another by a rigid septum 13. The upper stage 9b is divided into four chambers by means of three diaphragms 16, 17 and 18. The chamber bounded by the septum 13 and the diaphragm 18 communicates with, and thus forms part of the return conduit 5. The liquid enters laterally into the last-named chamber as shown symbolically by the arrow 19 and exits therefrom axially through a port 20, then rejoins the conduit 5 and flows in the direction of the arrow 21 to the tank 3 of the testing stand. The free end of the port 20 is formed as a seat for a valve member 22 constituted by the head of a piston 23 attached to the diaphragms 18, 17 and 16. The lower stage 9a is divided into two chambers by a diaphragm 14, to which there is attached a stem 15. The latter traverses the base of the port 20 in a fluid-tight manner and is adapted to reciprocate linearly along the axis of the port 20. The upper free terminus of the stem 15 constitutes an abutment for the valve member 22 as the latter moves in the direction of its seat. The conduits 10, 11 and 12 shown in FIG. 1 are illustrated symbolically in FIG. 2 by arrows bearing the same reference numerals. In addition, the arrow 24 indicates that the chamber bounded by the diaphragms 16 and 17 receives a fixed pneumatic signal, while the arrow 25 indicates that the chamber defined by the diaphragms 17 and 18 is in communication with the ambient atmosphere. Thus, the pressure prevailing in the last-named chamber is identical to the atmospheric pressure.

The lower stage 9a functions as a sensor stage responsive to the supply flow rate. The lower surface of the diaphragm 14 is exposed to the pressure downstream of the nozzle 7 and thus positions the stem 15 to determine the regulating point of the valve. From this point, as a base value, the magnitude of the valve opening is controlled by the pressure differential between the return pressure (at 19) and the atmospheric pressure (at 25) and by the pressure differential between the pneumatic signal transmitted by the level sensor 8 (and indicated at 10) and the fixed pneumatic reference signal (indicated at 24).

The aforedescribed devices permit a balancing of the supply and return flow rates at each instance and consequently ensure that the liquid volume contained in the auxiliary circuit is maintained vary accurately at a constant value. It is noted, however, that this result is merely an intermediate step to achieve the eventual purpose: i.e., the maintenance of the liquid volume between two relatively close limits in the circuit tested. Such indirect means has been rendered necessary by the unfeasibility to control directly the liquid volume in the circuit tested. It is apparent, however, that the constancy of the volume contained in the auxiliary circuit, that is, the volume in the tank 3, ensures a constancy of the volume contained in the circuit tested only if the total volume of liquid is constant. This, however, is not the case since the liquid temperature increases during the tests. This increase of temperature may attain 40° C, which causes, in case of a hydraulic oil, a volume increase of 3%. Since the auxiliary circuit with its tank 3 which has to be large to effect a sufficient degasification, represents a volume which is about 10 times larger than the volume of the circuit tested, this increase of 3% cannot be absorbed by the circuit tested without exceeding permissible limits. Thus, the volume of the liquid contained in the auxiliary circuit should not be maintained at a constant value, but, on the contrary, it should be varied in such a manner to enable the tank 3 to absorb the variation of volume due to the temperature changes. This is the reason why the device 8 has to effect regulation of the liquid level in the tank 3 not from a fixed reference level, but from a reference level which varies with the temperature of the liquid.

Figure 3:
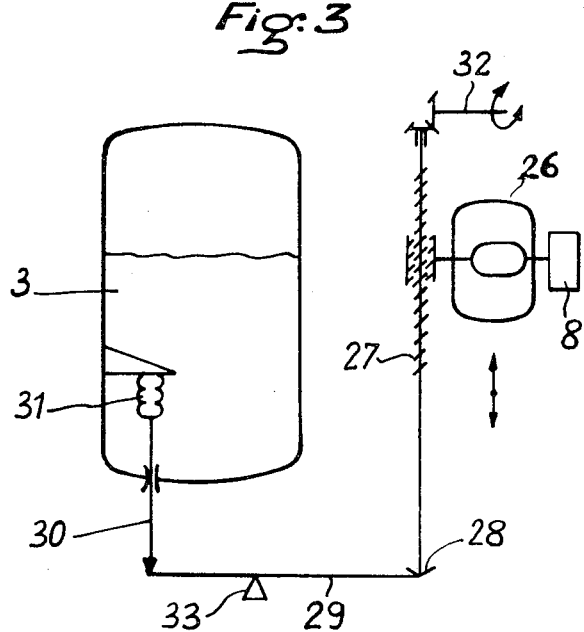
FIG. 3 schematically illustrates the principle of liquid level control by an auxiliary reservoir.

For the aforenoted purpose the device 8 is arranged as shown in FIG. 3. It is seen that the device 8 is connected not to the tank 3 but to an auxiliary reservoir 26 communicating with the top and the bottom of the tank 3 by means of flexible conduits not shown. The tank 3 and the auxiliary reservoir 26 are thus communicating vessels in which the absolute level of the liquid is the same. The reservoir 26 is mounted slidably on a stand and by varying its position thereon, the relative liquid level in the reservoir is also changed. Thus, if the position of the reservoir 26 on its stand is varied as a function of the temperature of the liquid, the device 8 will control the liquid level with respect to a fixed point on the reservoir 26, that is, with respect to a reference level which is a function of the temperature. For this purpose the motion of the auxiliary reservoir 26 is controlled, for example, by a threaded bar 27 which rotates at its lower end in a bearing 28 disposed at the terminus of a beam 29 supported on a fulcrum 33. The other end of the beam 29 is connected by an articulated rod 30 to a thermostatic bellows 31 situated in the tank 3 within the liquid. A manual operator lever 32 associated with the threaded bar 27 permits an initial setting and also, if need arises, an emptying or filling of the tank of the circuit tested by raising or lowering the auxiliary reservoir 26 to thus cause, respectively, an opening or a closing of the return valve. The quantity of hydraulic oil transferred from the tank of the circuit tested to the tank of the testing stand or conversely, is a function of the height to which the auxiliary reservoir 26 has been raised or lowered.

It is apparent that for a given volume of the auxiliary circuit and a given section of the tank 3, the fulcrum 33 may be positioned with respect to the beam 29 and the pitch of the threaded rod 27 may be selected in such a manner that all variations in the liquid volume due solely to the variation of temperature are absorbed by the tank 3 without any variation of the relative liquid level in the reservoir 26. The balancing of the supply flow rate and the return flow rate, that is the inlet and outlet flow rates relating to the tank 3 ensure the constancy of the liquid volume in the circuit tested with the exception of the effect of temperature with regard to this volume proper. The liquid in the circuit tested thus behaves exactly as during the normal operation of the circuit.

Figure 4:
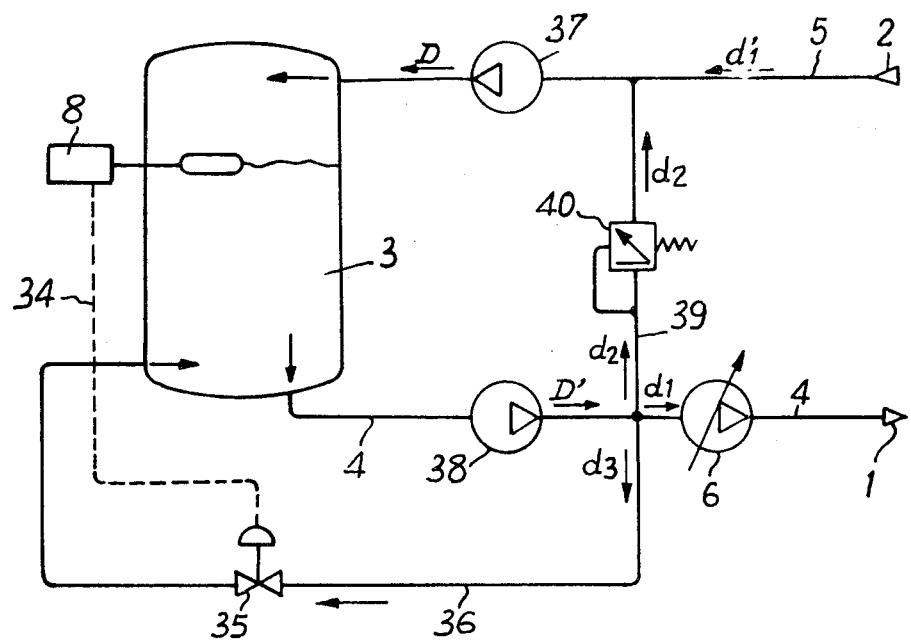
FIG. 4 is a schematic illustration of a second embodiment of the invention.

Turning now to FIG. 4, there is shown another embodiment of the invention. In this embodiment the auxiliary circuit comprises, similarly to that shown in FIG. 1, couplings 1 and 2 for the circuit tested, a tank 3, a feed conduit 4 containing a high pressure pump 6 of variable output, a return conduit 5 and a level sensor and regulator 8.

The device 8, shown symbolically as being operatively connected to the tank 3, is in practice mounted on a movable auxiliary reservoir as shown and described in connection with FIG. 3 in such a manner as to eliminate the volume variations due to temperature changes. It transmits a pneumatic signal forwarded by a line 34 to a pneumatic valve 35 contained in a return conduit 36 returning the excess feed flow to the tank 3 as it will be explained hereinafter.

Similarly to the arrangement shown in FIG. 1, the only problem encountered is to balance at any moment the feed and return flow rates. A first, coarse balancing is obtained by disposing at the inlet and the outlet of the tank 3 in the conduits 5 and 4, two pumps 37 and 38 which have a low pressure constant output of relatively close value. The pump 37 which is disposed in the return conduit 5 at the inlet of the tank 3 has an output which generates a flow rate at least equal to the maximum flow rate during operation. The pump 38 which is disposed in the supply conduit 4 between the tank 3 and the high pressure pump 6 has a slightly higher output, so that the output of the pump 38 is always larger than that of the pump 6; the pump 38 thus feeds the circuit tested with a flow rate that is larger than the maximum flow rate in said circuit. A conduit 39 connects the conduits 4 and 5 at the outlet of the pump 38 and at the inlet of the pump 37. In the conduit 39 there is disposed a bypass valve 40. The conduit 36, which contains the pneumatic valve 35, is connected to the supply conduit 4 between the pumps 38 and 6. The direction of liquid flow in the different branches of the auxiliary circuit is indicated in FIG. 4 by arrows, the reference characters of which will be considered as representing the corresponding flow rate values. Thus, D is the flow rate across pump 37, D' is the flow rate across pump 38, $d1$ is the flow rate through pump 6, $d'1$ is the return flow rate across coupling 2, $d2$ is the flow rate in the conduit 39 and $d3$ is the flow rate in the conduit 36.

The pump 37 combines the return flow rate through the coupling 2 and the bypass flow rate through the valve 40; thus $D = d'1 + d2$.

Similarly, it is apparent that $D' = d'1 + d2 + d3$.

When the liquid levels are stabilized in the tank of the circuit tested and in the tank 3 of the testing stand, then $d'1 = d1$ and $D' - D = d3$. The conduit 36 returns to the tank 3 the liquid resulting from the excess flow rate of the pump 38 with respect to the pump 37.

When the liquid volume in the circuit tested increases, $d'1$ should be increased. Since D remains constant, $d2$ should be reduced. Since D' is constant and $d1$ is predetermined, in order to diminish $d2$, it is necessary to increase $d3$. More precisely, the increase of the liquid volume in the circuit tested brings about a lowering of the level in the tank 3 (or more precisely, in the auxiliary reservoir 26) and the regulator 8 opens to a greater extent the valve 35 which thus causes an increase of the flow rate $d3$. Conversely, in case of a decrease of the liquid volume in the circuit tested, a decrease of $d'1$ is obtained by an increase of $d2$, that is, by a decrease of $d3$ which, in turn, results from a reduction of the flow passage of the valve 35 effected by an increase in the liquid level in the tank 3.

In case of rapid variations in the flow rate necessitated by the testing program and/or the operation of the circuit tested, the sole active components that work in the testing stand are the pump 6 of variable output and the bypass valve 40. The sum of the flow rate through these two components equals D, so that $d'1$ remains equal to $d1$.

It is to be understood that a number of modifications may be effected in the auxiliary circuit without departing from the scope of the invention. In addition to various control and/or safety mechanisms that may be associated with the circuit as stated earlier, it is feasible to dispose the components differently or to replace them with equivalent means.

What is claimed is:

1. In a method of testing a hydraulic circuit coupled to an auxiliary hydraulic circuit of a testing stand, said auxiliary circuit including a tank into which hydraulic liquid is introduced and from which hydraulic liquid is withdrawn during the course of liquid circulation in said circuits, the improvement comprising the steps of
   A. continuously effecting a coarse balancing of the flow rates into and out of said tank and
   B. intermittently effecting a fine balancing of said flow rates in response to those volume variations of the hydraulic liquid in said tank which are greater than the volume variations for the entire auxiliary circuit due solely to the temperature variations of said liquid during normal operation.

2. In a testing stand for examining a hydraulic circuit, said testing stand including an auxiliary hydraulic circuit having (a) a tank, (b) first conduit means leading to said tank, (c) second conduit means leading from said tank, (d) a variable output high-pressure pump in said second conduit means, (e) a return valve in said first conduit means, (f) a nozzle contained in said second conduit means downstream of said pump, (g) coupling means provided in said first and second conduit means for connecting said auxiliary hydraulic circuit to the hydraulic circuit to be tested, the improvement comprising
   A. first control means associated with at least one of said conduit means for effecting a continuous coarse balancing of the flow rates of hydraulic liquid entering and leaving said tank through said first and second conduit means, respectively,
   B. second control means connected with said return valve to operate the latter as a function of the liquid level in said tank related to a reference value and
   C. means connected to said second control means for varying said reference value as a function of the temperature of said hydraulic liquid in said auxiliary circuit, said second control means and said means connected to said second control means effecting an intermittent fine balancing of said flow rates.

3. An improvement as defined in claim 2, said first control means being formed of a balanced valve disposed in said first conduit means, said balanced valve including
   A. third and fourth conduit means connecting said balanced valve with said second conduit means upstream and downstream of said nozzle,
   B. a movable valving member for determining the flow rate of hydraulic liquid in said first conduit means,
   C. a movable abutment limiting the closing movement of said movable valving member and
   D. means positioning said movable abutment as a function of the pressure difference upstream and downstream of said nozzle.

4. An improvement as defined in claim 3, said balanced valve being disposed in said first conduit means upstream of said return valve.

5. An improvement as defined in claim 3, said return valve and said balancing valve being combined into a unitary valve structure including
   A. a first diaphragm having one face exposed through said third conduit means to the liquid pressure upstream of said nozzle and another, opposite face exposed through said fourth conduit means to the liquid pressure downstream of said nozzle,
   B. means affixing said movable abutment to said first diaphragm,
   C. a second diaphragm having one face exposed to the liquid pressure in said first conduit, and another, opposite face exposed to atmospheric pressure,
   D. a third diaphragm, having one face exposed to a pressure signal transmitted by said valve control means as a function of the liquid level in said tank, and another face exposed to a fixed pressure signal,
   E. a fourth diaphragm disposed between said second and third diaphragms and having one face exposed to said fixed pressure signal and another, opposite face exposed to said atmospheric pressure and
   F. means affixing said second, third and fourth diaphragms to said movable valving member.

6. An improvement as defined in claim 2, said first control means including
   A. a first additional constant output pump disposed in said second conduit means upstream of said variable output pump and operating codirectionally therewith, B. a second additional constant output pump having a slightly lesser output than said first additional pump and being disposed in said first conduit means for driving hydraulic liquid towards said tank, C. a first branch conduit connecting said first conduit means at a location upstream of said second additional pump with said second conduit means at a location between said variable output pump and said first additional pump and D. second branch conduit connecting said tank with said second conduit means at a location between said variable output pump and said first additional pump, said second branch conduit forming part of said first conduit means and containing said return valve.

7. An improvement as defined in claim 2, said means connected to said second control means for varying said reference value including A. an auxilary reservoir containing hydraulic liquid having a reference level, said auxiliary reservoir being separate from said tank, B. means for varying said reference level as a function of the liquid temperature in said auxiliary hydraulic circuit and C. means for varying said reference value in said second control means as a function of the variation in the reference level of the liquid in said auxiliary reservoir.

8. An improvement as defined in claim 7, including

A. means for vertically movably supporting said auxiliary reservoir,

B. hose means for maintaining continuous communication between said tank and said auxiliary reservoir, C. heat expandable means submerged in the hydraulic liquid contained in said tank and D. mechanical means for vertically moving said auxiliary reservoir in response to the extent of expansion of said heat expandable means.

* * * * *